United States Patent
Peri (10) Patent No.: US 10,565,724 B2
(45) Date of Patent: Feb. 18, 2020

(54) SYSTEM AND METHODS FOR DEVICE TRACKING

(71) Applicant: Samsung Electronics Co., Ltd., Suwon-si, Gyeonggi-do (KR)

(72) Inventor: Christopher A. Peri, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 66 days.

(21) Appl. No.: 15/854,620

(22) Filed: Dec. 26, 2017

(65) Prior Publication Data

US 2019/0012792 A1    Jan. 10, 2019

Related U.S. Application Data

(60) Provisional application No. 62/529,833, filed on Jul. 7, 2017.

(51) Int. Cl.
*G06K 9/00* (2006.01)
*G06T 7/73* (2017.01)
(Continued)

(52) U.S. Cl.
CPC .............. *G06T 7/73* (2017.01); *G01P 15/18* (2013.01); *G06F 3/011* (2013.01);
(Continued)

(58) Field of Classification Search
CPC ..... G01P 15/18; G06F 3/011; G06K 9/00624; G06T 2207/30244; G06T 7/11; G06T 7/20; G06T 7/246; G06T 7/70; G06T 7/73
See application file for complete search history.

(56) References Cited

U.S. PATENT DOCUMENTS

| 8,953,029 B2 | 2/2015 | Zalewski |
| 8,955,749 B2 | 2/2015 | Elefante |

(Continued)

FOREIGN PATENT DOCUMENTS

| CN | 103278177 A | 9/2013 |
| JP | 2016045874 A | 4/2016 |

(Continued)

OTHER PUBLICATIONS

ISA/KR, "International Search Report and Written Opinion of the International Searching Authority," International Application No. PCT/KR2018/007719, dated Nov. 2, 2018, 8 pages.

*Primary Examiner* — Bhavesh M Mehta
*Assistant Examiner* — Ian L Lemieux (57) ABSTRACT

A method for tracking a position of a device is provided, wherein the method includes capturing, at a first positional resolution, based on information from a first sensor, a first position of the device within an optical tracking zone of the first sensor. The method also includes determining, based on information from the first sensor, that the device exits the optical tracking zone of the first sensor. Further, the method includes responsive to determining that the device exits the optical tracking zone of the first sensor, capturing, at a second positional resolution, a second position of the device based on acceleration information from a second sensor, wherein the second positional resolution corresponds to a minimum threshold value for the acceleration information from the second sensor.

20 Claims, 8 Drawing Sheets

(51) Int. Cl.
  *G06T 7/246* (2017.01)
  *G06T 7/11* (2017.01)
  *G06T 7/579* (2017.01)
  *G06T 7/70* (2017.01)
  *G01P 15/18* (2013.01)
  *G06F 3/01* (2006.01)
  *G06T 7/20* (2017.01)

(52) U.S. Cl.
  CPC ............ *G06K 9/00624* (2013.01); *G06T 7/11* (2017.01); *G06T 7/20* (2013.01); *G06T 7/246* (2017.01); *G06T 7/579* (2017.01); *G06T 7/70* (2017.01); *G06T 2207/30244* (2013.01)

(56) References Cited

U.S. PATENT DOCUMENTS

| | | |
|---|---|---|
| 9,448,405 B2 | 9/2016 | Yamamoto |
| 9,495,589 B2 | 11/2016 | Strombom et al. |
| 2010/0150404 A1* | 6/2010 | Marks .................. G06T 7/20 |
| | | 382/107 |
| 2016/0225191 A1 | 8/2016 | Mullins |
| 2016/0364013 A1 | 12/2016 | Katz et al. |
| 2017/0357332 A1* | 12/2017 | Balan ................ G02B 27/0093 |

FOREIGN PATENT DOCUMENTS

| | | |
|---|---|---|
| JP | 2016192027 A | 11/2016 |
| JP | 6074525 B1 | 1/2017 |
| KR | 10-2016-0000986 A | 1/2016 |
| WO | 2015103621 A1 | 7/2015 |

* cited by examiner

SYSTEM AND METHODS FOR DEVICE TRACKING

CROSS-REFERENCE TO RELATED APPLICATION AND CLAIM OF PRIORITY

This application claims priority under 35 U.S.C. § 119(e) to U.S. Provisional Patent Application No. 62/529,833 filed on Jul. 7, 2017. The above-identified provisional patent application is hereby incorporated by reference in its entirety.

TECHNICAL FIELD

This disclosure relates generally to tracking electronic devices and determination of a device's position using two or more heterogeneous sensors, including at least one sensor employing an optical sensor. More specifically, this disclosure relates to systems and methods for tracking electronic devices when at least one of the two or more heterogeneous sensors has a temporally or spatially dynamic error profile.

BACKGROUND

Certain digital devices, such as smartphones, tablets, virtual reality headsets, and the like, can track the physical position of other electronic devices within a coordinate space using data received from sensors on the device and data from sensors on the electronic device being tracked. Further, each sensor may have a limited tracking zone.

SUMMARY

This disclosure provides systems and methods for device tracking.

In a first embodiment, a method for tracking a position of a device is provided, wherein the method includes capturing, at a first positional resolution, based on information from a first sensor, a first position of the device within an optical tracking zone of the first sensor. The method also includes determining, based on information from the first sensor, that the device exits the optical tracking zone of the first sensor. Responsive to determining that the device exits the optical tracking zone of the first sensor, a second position of the device is captured at a second positional resolution based on acceleration information from a second sensor, wherein the second positional resolution corresponds to a minimum threshold value for the acceleration information from the second sensor.

In a second embodiment, a system for tracking the position of a device is provided, wherein the system includes a memory, a first sensor, an input/output interface, and a processor operably connected to the memory, the input/output interface and the first sensor. Additionally, the processor is configured to capture, at a first positional resolution, based on information from the first sensor, a first position of the device within an optical tracking zone of the first sensor, and determine, based on information from the first sensor, that the device exits the optical tracking zone of the first sensor. Responsive to determining that the device exits the optical tracking zone of the first sensor, the processor is configured to capture, at a second positional resolution, a second position of the device based on acceleration information from a second sensor received via the input/output interface, wherein the second positional resolution corresponds to a minimum threshold value for the acceleration information from the second sensor.

In a third embodiment, a non-transitory computer-readable medium is provided, the medium storing program code, that when executed by a processor causes a system to capture, at a first positional resolution, based on information from a first sensor, a first position of a device within an optical tracking zone of the first sensor, determine, based on information from the first sensor, that the device exits the optical tracking zone of the first sensor and responsive to determining that the device exits the optical tracking zone of the first sensor, capture, at a second positional resolution, a second position of the device based on acceleration information from a second sensor, wherein the second positional resolution corresponds to a minimum threshold value for the acceleration information from the second sensor.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 8 discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged electronic device.

According to certain embodiments of the present disclosure, systems and methods for tracking the position of a device using heterogeneous sensors having varying positional resolutions, error profiles or limited tracking zones are provided herein.

Figure 1:
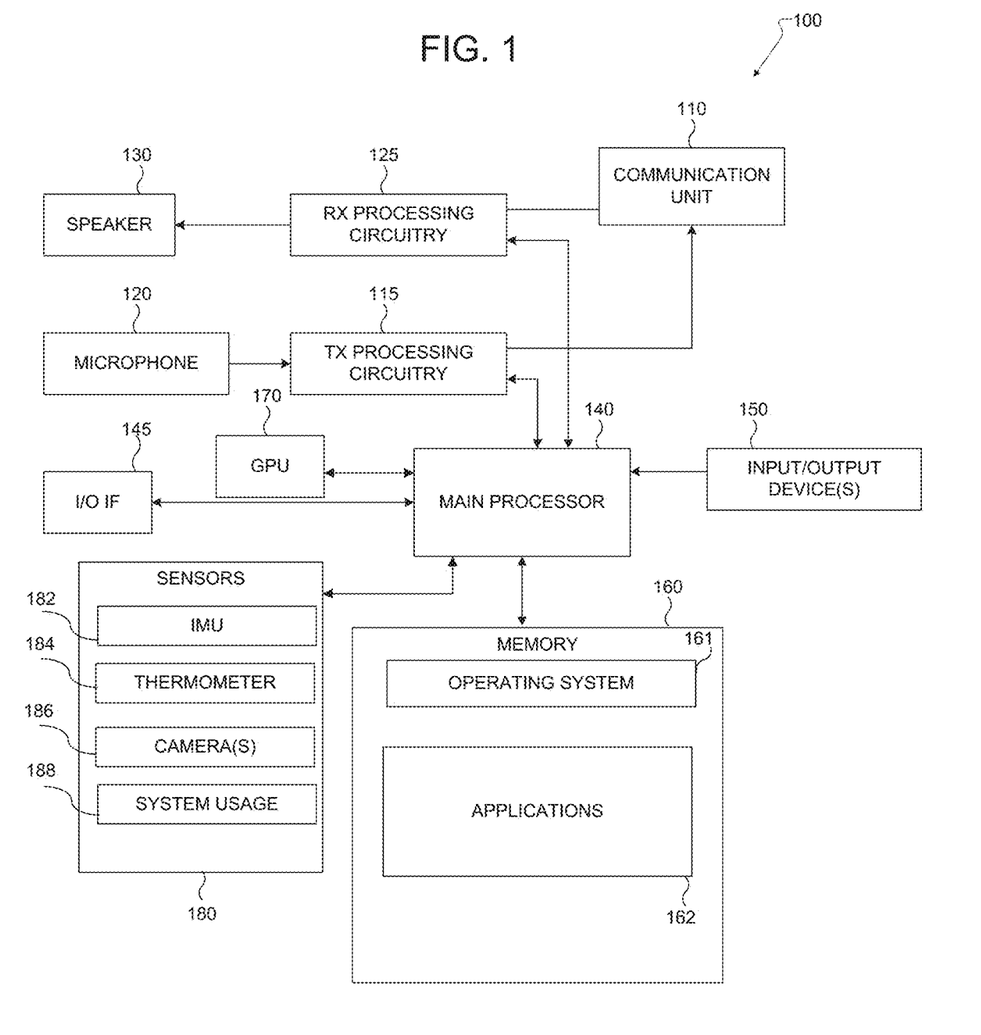
FIG. 1 illustrates an example of an electronic device in which various embodiments of the present disclosure can be implemented.

FIG. 1 illustrates an example of a device for implementing device tracking according to this disclosure. The embodiment of device 100 illustrated in FIG. 1 is for illustration only, and other configurations are possible. However, suitable devices come in a wide variety of configurations, and FIG. 1 does not limit the scope of this disclosure to any particular implementation of a device.

As shown in FIG. 1, the device 100 includes a communication unit 110 that may include, for example, a radio frequency (RF) transceiver, a Bluetooth® transceiver, or a Wi-Fi® transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes an operating system (OS) program 161 and one or more applications 162.

Applications 162 can include games, virtual reality (VR) applications, augmented reality (AR) applications, operating systems, device security (e.g., anti-theft and device tracking) applications or any other applications using the tracked position of an electronic device as an input. Additionally, applications 162 can, according to embodiments, output tracked position data on an input/output device 150 as part of a display on a screen.

The communication unit 110 may receive an incoming RF signal, for example, a near field communication signal such as a Bluetooth® or Wi-Fi® signal. The communication unit 110 may down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data).

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user, sensors 180 or applications 162. Applications 162 can include applications specifically developed for the platform of device 100, or legacy applications developed for earlier platforms. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, touch screens, mouse(s), track balls or other devices capable of acting as a user interface to allow a user to interact with electronic device 100. In some embodiments, input/output device(s) 150 can include a touch panel, a virtual reality headset, a (digital) pen sensor, a key, or an ultrasonic input device. Input/output device(s) 150 are, according to certain embodiments, associated with one or more of sensor(s) 180 to provide input to main processor 140.

Input/output device(s) 150 can include one or more screens, which can be a liquid crystal display, light-emitting diode (LED) display, an optical LED (OLED), an active matrix OLED (AMOLED), or other screens capable of rendering graphics.

The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1.

For example, according to certain embodiments, device 100 can further include a separate graphics processing unit (GPU) 170, and sensors 180.

Sensors 180 can comprise a variety of sensors for generating inputs processed by device 100, and include without limitation, accelerometers, barometric pressure sensors, inertial measurement units (IMUs), digital cameras, touch sensors, digital thermometers, pressure sensors and global positioning system sensors. For example, sensors 180 can include an inertial measurement unit 182. Inertial measurement unit 182 can be an optical sensor, an accelerometer or a gyroscopic sensor. Additionally, inertial measurement unit 182 can comprise a plurality of IMUs, such as motion detectors coupled to a user's head or limbs. Additionally, sensors 184 may include a thermometer 184, camera 186, and sensors 188 for monitoring system usage. Camera 186 can be multiple cameras disposed on the exterior of the device to capture external image data, such as cameras for providing an augmented reality (AR) experience, in which digital images are superimposed over the view of a camera positioned on or near a user's eye. Camera 186 can also be any suitable camera capable of generating image data suitable for tracking motion based on emissions in the visible or invisible regions of the electromagnetic spectrum, such as visible light or infrared. Further, sensors 180 can include sensors 188 configured to monitor the usage of system resources, including, without limitation, main processor 140, GPU 170 or memory 160.

Although FIG. 1 illustrates one example of a device 100 for implementing device tracking, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
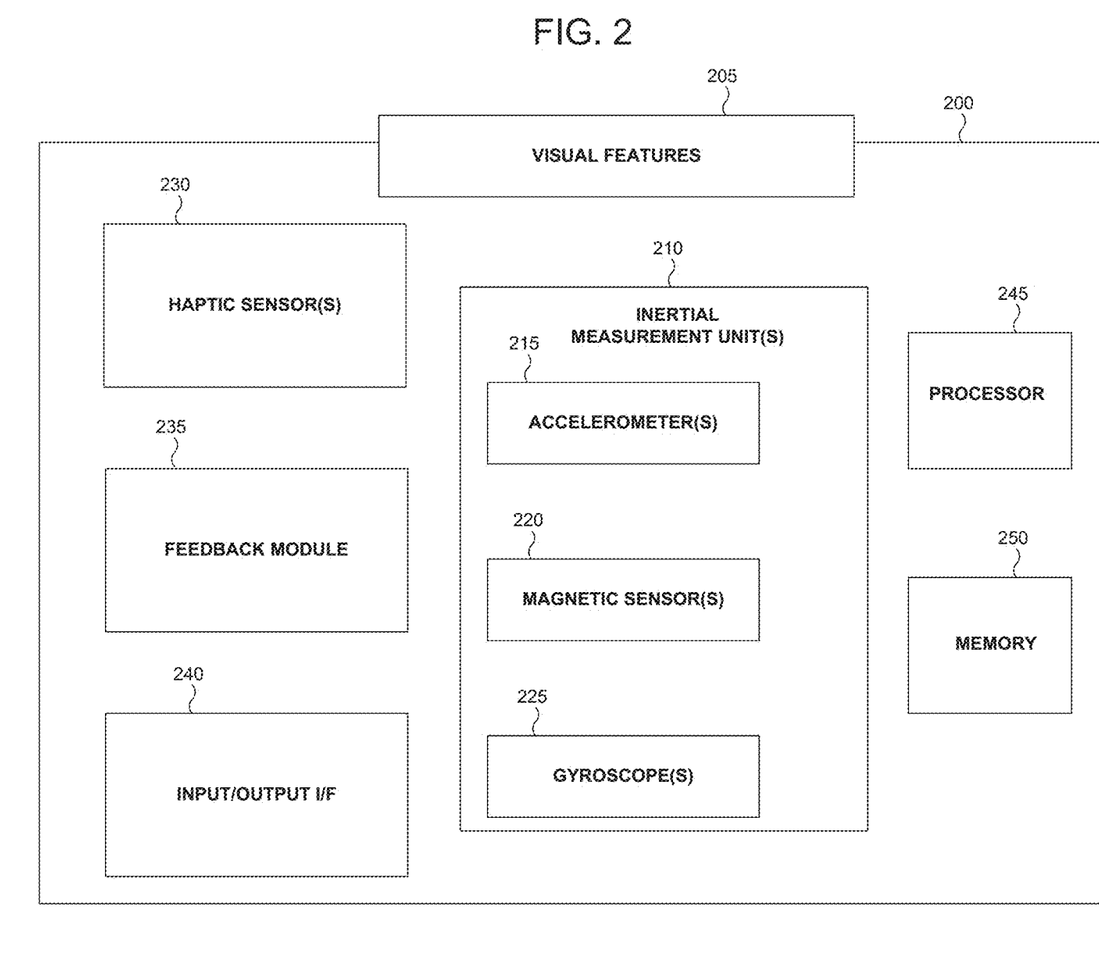
FIG. 2 illustrates an example of a tracked electronic device according to certain embodiments of this disclosure.

FIG. 2 illustrates an example of a tracked electronic device 200 according to this disclosure. The embodiment of the tracked electronic device 200 shown in FIG. 2 is for illustration only. Other embodiments could be used without departing from the scope of the present disclosure.

According to certain embodiments, tracked electronic device 200 is a peripheral device to electronic device 100 shown in FIG. 1. In some embodiments, tracked device 200 is a VR specific peripheral, such as a wand or glove. In some other embodiments, tracked device is a more general peripheral device to electronic device 100, such as a smart watch. According to other embodiments, tracked device 200 is a fully-featured device, such as electronic device 100. In some embodiments, tracked device 200 is a smartphone or tablet. Numerous variations are possible.

In some embodiments, tracked device 200 has visual features 205, which comprise, for example, shapes, colors, features or patterns that can be recognized by a camera or optical sensor, such as camera 186 shown in FIG. 1. In some embodiments, visual features 205 are a characteristic shape, a region containing one or more machine-recognizable color (s), such as the green used in video chroma keying, or a machine-readable pattern, such as a QR code. In other embodiments, visual features 205 are small, light emitters disposed on, or near the surface of tracked electronic device 200.

According to certain embodiments, tracked electronic device 200 includes inertial measurement units (IMUs) 210. Inertial measurement units 210 can track the motion tracked electronic device along multiple axes of a spatial coordinate system, and can include IMUs sensing motion along, for example, 3, 6, 9, 10 or 11 degrees of freedom (DOF).

According to some embodiments, inertial measurement units 210 include accelerometers 215, which can be of any suitable type for registering the acceleration of tracked electronic device 200. Accelerometers 215 can be laser accelerometers, global positioning system based accelerometers, piezoresistive accelerometers or micro electro mechanical system (MEMS) accelerometers.

Further, in some embodiments, inertial measurement units 210 include magnetic sensors 220 capable of registering acceleration or movement based on changes in a detected magnetic field.

Additionally, inertial measurement units 210 can include gyroscopes 225, which can include gyro or angular rate sensors. According to certain embodiments, gyroscopes 225 utilize a piezoelectric transducer or a silicon transducer.

In some embodiments, tracked electronic device 200 includes haptic sensors 230 for registering touch movements. For example, if tracked electronic device 200 is an electronic glove or peripheral intended to simulate a real-world object, such as a bat or a ball, haptic sensors 230 may operate to identify the location and level of pressure provided by a user's fingers' interaction with tracked electronic device 200. Accordingly, haptic sensors provide a heightened level of realism for certain applications for which registering a user's very fine motor activity is desirable, such as VR simulations of playing a musical instrument, using a bow and arrow, or as discussed in greater detail herein, pitching a baseball.

According to certain embodiments, tracked electronic device 200 includes a feedback module 235. Feedback module 235 can, according to various embodiments, be any suitable device for providing sensory feedback, including vibratory devices, such as a rumble pack, devices providing changes in temperature, or a module containing one or more gyroscopes whose angular momentum can be controlled to generate resistance to a user's motions.

According to certain embodiments, tracked electronic device also includes an input/output interface (I/F) 240. In such embodiments, input/output interface 240 operates as an interface between tracked electronic device 200 and electronic device 100. Input/output I/F 240 may communicate with electronic device 100 over a wired connection, or wirelessly (such as by Wi-Fi® or Bluetooth® Low Energy), interfacing with a communication unit of electronic device 100, such as communication unit 110 shown in FIG. 1.

In some embodiments, input/output I/F 240 provides, for example, motion history data stored in memory 250, outputs from inertial measurement unit 210 and haptic sensor 230 to electronic device 100. Additionally, input/output OF 240 can receive power for visual features 205, as well as inputs for feedback module 240.

Further, tracked electronic device 200 can include one or more processors 245, which can, for example, receive process and store outputs from inertial measurement unit 210 or haptic sensors 230, or a combination thereof. Additionally, processor 245 can generate and store a motion history for tracked electronic device in a memory 250.

Although FIG. 2 illustrates one example of a tracked electronic device various changes may be made to FIG. 2. For example, additional sensors may be included in tracked electronic device 200, such as temperature sensors or barometric sensors capable of registering changes in the elevation of tracked electronic device 200.

Figure 3A:
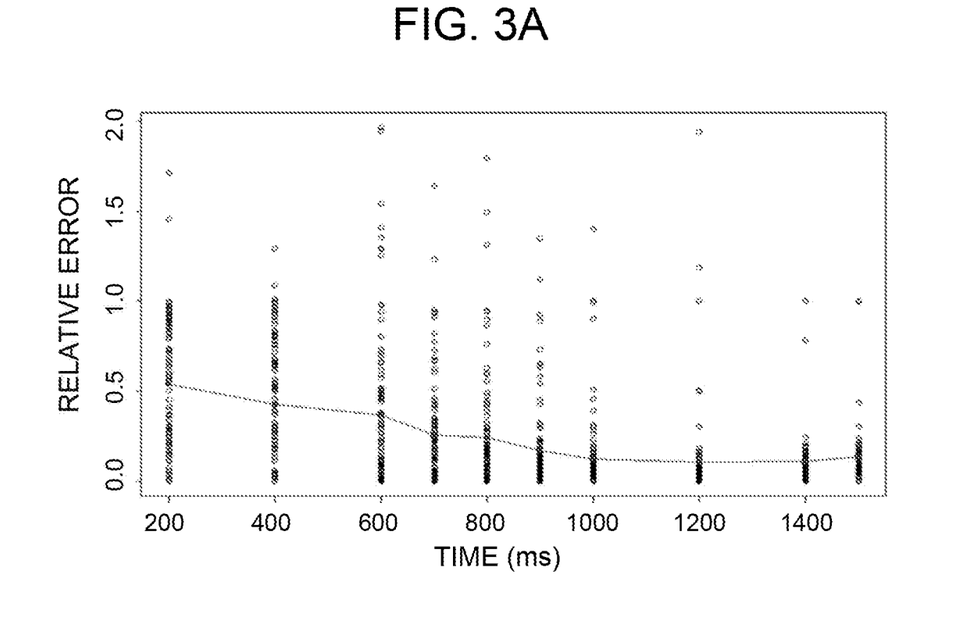
FIG. 3A provides an example of a plot of error data from a sensor whose error profile has a temporally dynamic component.

FIG. 3A provides an example of a plot of error data from a sensor whose error profile has a temporally dynamic component. The plot shown in FIG. 3A is for illustration only and using one example data set. Different data set values and other graphic representations of data set values could be used without departing from the scope of this disclosure.

Electronic sensors can, to varying degrees, exhibit some level of measurement error. The extent of the observed measurement error for a sensor and circumstances associated with measurement error may be termed the error profile for the sensor.

In the example of FIG. 3A, a scatterplot of the observed error of an acceleration measurement from an IMU relative to the time of measurement is shown. The horizontal axis of the scatterplot represents the time, in milliseconds (msec) from a time when the IMU initiates a lateral acceleration. For example, "200" represents acceleration measurements taken at a time where the IMU has been laterally accelerating for ⅕ of a second (200 msec).

The vertical axis of the scatterplot shown in FIG. 3A represents a quantification of the error between the lateral acceleration as measured by the IMU relative to the actual acceleration, with "0" representing perfect correspondence between the measured and actual lateral acceleration.

As noted above, FIG. 3A provides a scatterplot of error data showing that the error profile for this particular IMU has temporally dynamic components. A first temporally dynamic component of the error profile for this particular sensor is the manner in which mean relative error decreases at longer time intervals. At time t=200, the mean relative error (shown as the line running through the data from time t=200 msec to t=1500 msec) is at its highest, having a value of slightly over 0.5. A second temporally dynamic component of the error profile for this particular sensor is the manner in which the "tails" of the error distribution grow with time, as shown by the number of data points significantly above the mean relative error at times greater than t=600 msec.

Figure 3B:
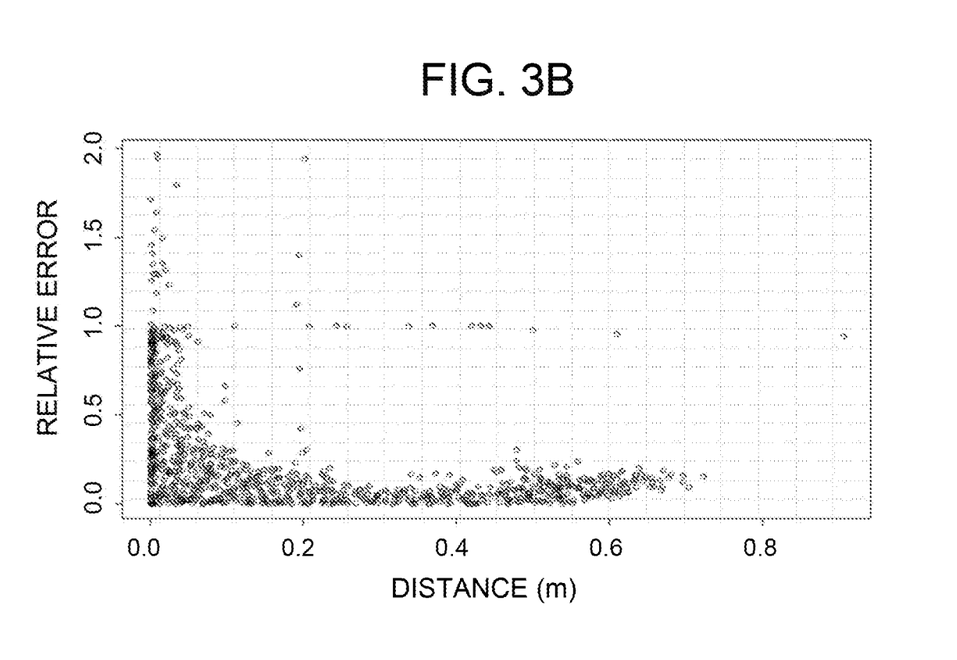
FIG. 3B provides an example of a plot of error data from a sensor whose error profile has a spatially dynamic component.

FIG. 3B provides an example of a plot of error data from a sensor whose error profile has a spatially dynamic component. The plot shown in FIG. 3B is for illustration only and using one example data set. Different data set values and other graphic representations of data set values could be used without departing from the scope of this disclosure.

In the example of FIG. 3B, a scatterplot of the observed error of an acceleration measurement from an IMU relative to distance covered by the IMU is shown. The horizontal axis of the scatterplot represents the distance, in meters, covered by an IMU undergoing a lateral acceleration.

As in FIG. 3A, the vertical axis of the scatterplot shown in FIG. 3B represents a quantification of the error between the lateral acceleration as measured by the IMU relative to the actual acceleration, with "0" representing a perfect correspondence between the measured and actual lateral acceleration.

The distribution of relative error data in FIG. 3B shows that the error profile for the measured IMU has a spatially dynamic component, with small motions, such as motions of less than 10 cm (0.1 m) exhibiting a higher mean relative error and a longer-tailed distribution of relative error than gross motions, such as motions over distances of 0.3 meters.

The error profile for a given sensor may have both spatially and temporally dynamic components, and that other dynamic error components, such as directionally and thermally dynamic error components are possible. For example, in the case of a 6 DOF IMU, the relative error for lateral movements along the x-, y- and z-axes may be significantly greater than the relative error for movements along rotational degrees of freedom. Similarly, the various components of the error profile of a sensor may define a characterization of the sensor's behavior. For example, gyroscopes, IMUs and other sensors whose error profile have a significant temporally dynamic component, may, depending on the overall nature of the error profile be said to be "slow," or "fast" or prone to "drift." Similarly, sensors whose error profiles have a significant spatially dynamic component or wide distributions of relative error data may be said to be "noisy."

Other representations of a given sensor's error profile are possible. For example, the error profile of an accelerometer may be represented by a degradation curve representing the positional resolution (i.e., an expression of the magnitude of a change of position that can be reliably captured by the sensor) as a function of a time, such as a time after calibration.

Figure 4:
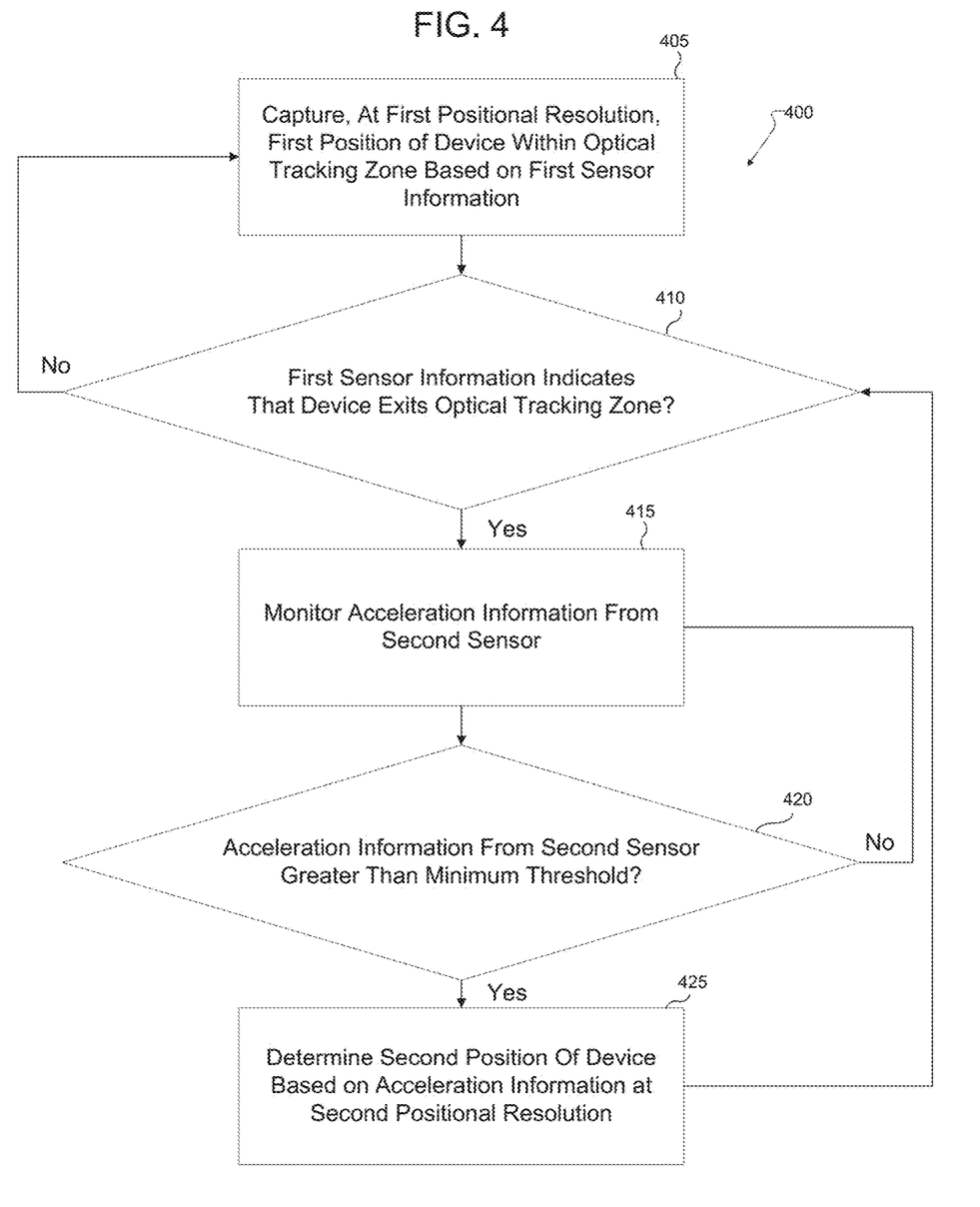
FIG. 4 illustrates a process for tracking a device according to this disclosure.

FIG. 4 illustrates a process 400 for tracking a device according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, a device for implementing device tracking.

In operation 405, an electronic device, such as the electronic device 100 shown in FIG. 1, captures at a first positional resolution, a first position of the tracked device within an optical tracking zone of a first sensor of the electronic device. According to certain embodiments, the first sensor may be one or more camera, such as camera 186 shown in FIG. 1.

According to some embodiments, the electronic device captures the position of the tracked device by receiving image data from the first sensor, recognizes the tracked device within the image data, and based on the image data, determines a first position of the device. Alternatively, the electronic device can capture the position of the device using a first sensor, and one or more other sensors, including sensors disposed on the tracked device. These sensors on the electronic device and the tracked device can, depending on embodiments, be heterogeneous and responsive to different types of inputs (e.g., lateral acceleration, rotational acceleration, optical inputs, and changes in magnetic field).

The optical tracking zone is, in certain embodiments, the field of view of a camera on the electronic device. In other embodiments, the optical tracking zone is a shared field of view between two or more cameras or optical sensors on the electronic device.

In certain cases, the electronic device recognizes the tracked device according to a plurality of methods, including recognizing visual features (such as visual features 205 shown in FIG. 2). Further, in some embodiments, the position of the tracked device may be captured as coordinate values in a spatial coordinate system having three or more degrees of freedom.

The electronic device performs a determination, based at least in part on information from the first sensor, that the tracked device has exited the optical tracking zone of the first sensor in operation 410. According to some embodiments, the tracked device exits the optical tracking zone of the first sensor by moving outside of field of view of the first sensor. In other embodiments, such as where the optical tracking zone is a subspace of the field of view of the first sensor, exiting the optical tracking zone may be moving outside of the subspace of the first sensor's field of view comprising the optical tracking zone to a peripheral region of the field of view where the first sensor's viewing angle is too shallow to resolve and recognize visual features (such as visual features 205 in FIG. 2) of the tracked device.

According to certain embodiments, if, at operation 410, information from the first sensor indicates that the tracked device has not exited the optical tracking zone of the first sensor, process 400 loops back to operation 405. If, however, the electronic device determines, based on information from the first sensor, that the tracked device has exited the optical tracking zone of the first sensor, process 400 advances to operation 415.

At operation 415, the electronic device monitors acceleration information received from a second sensor measuring, at a minimum, an acceleration at the tracked device. According to certain embodiments, the second sensor is an inertial measurement unit (IMU), such as IMU 210 shown in FIG. 2. In other embodiments, the second sensor can be two or more sensors capable of measuring acceleration, such as magnetic sensors 220 and gyroscopes 225 shown in FIG. 2. Additionally, the acceleration information collected by the second sensor may be stored in a memory (such as memory 250 in FIG. 2 or memory 160 in FIG. 1, or a combination thereof) as part of a motion history for the tracked device.

In operation 420, the electronic device performs a determination of whether the monitored acceleration information from the second sensor exceeds a minimum threshold value. According to certain embodiments, the minimum threshold value is set according to the error profile for the second sensor. For example, where the error profile for the second sensor shows that the sensor is "noisy" or prone to "drift," the minimum threshold value may be set such that only acceleration information resulting from a user's gross motor activity exceeds the minimum threshold. In some cases, such as video games, where the second sensor monitors the movement of a user's hand or an object held by the user, such an elevated minimum threshold may be desirable, as "false inputs" resulting from sensor noise may result in an unpleasant user experience.

According to certain embodiments, the minimum threshold for acceleration information may be one or more of dynamic, or programmatically determined in response to a variety of factors. Such factors can include, without limitation, temperature (as the error profile of some IMUs can vary with temperature), a motion history of the device, the application running on the device, or the type of input expected for the application running on the device, or a combination thereof. For example, where the motion history of the device indicates that a particular user is unusually capable of gross motor activity and can vigorously accelerate the tracked device, the minimum threshold may be adjusted upwards to compensate for the scale of the user-generated accelerations. Similarly, where the motion history suggests a less vigorous user, whose gross motor activities are associated with smaller accelerations, the minimum threshold may likewise be adjusted downwards. Alternatively, the minimum threshold may be adjusted in response to a tracked history of the application.

Returning to VR baseball simulations as non-limiting examples of applications which can use device tracking according to the systems and methods of this disclosure, the minimum threshold for acceleration information can also be based on the application and the type of expected input. Depending on the context and state of game play, the application logic of the VR baseball simulation may expect inputs corresponding to varyingly fine or gross motor activities. For example, where a simulation of batting is provided, the application expects inputs corresponding to the gross motor activity of swinging a bat and adjusts the minimum threshold upwards to only capture large movements corresponding to the swing of a virtual bat. In this way, the logic of the application does not have to distinguish between sensor errors and application inputs, as a dynamically adjusted minimum threshold for acceleration information can avert undesirable glitches in the gameplay, such as a bat appearing to shake, shiver or wander in the user's hands. Alternatively, where a simulation of throwing or catching a ball is provided, the application may adjust the minimum threshold downwards for some portion of the throwing motion, to capture more detail of a user's fine motor activity.

According to certain embodiments, if the electronic device determines at operation 420 that the acceleration information received from the second sensor is not greater than the minimum threshold, then the process returns to operation 415, where the electronic device continues to monitor acceleration information from the second sensor. If, however, the electronic device determines at operation 420 that the acceleration information from the second sensor is greater than the minimum threshold, the process advances to operation 425.

At operation 425, the electronic device determines a second, updated position of the tracked device based on acceleration information from the second sensor at a second positional resolution. In some embodiments, the second positional resolution corresponds to the minimum threshold for acceleration information from the second sensor. Where the minimum threshold for acceleration from the second sensor is high, the positional resolution of the tracked device is lower, with the position of the tracked device expressed in multiples of comparatively larger spatial units, such as, for example, 30 cm increments. Similarly, where the minimum threshold for acceleration from the second sensor is lower, the positional resolution of the tracked device is higher, and the position of the tracked device may be expressed in multiples of comparatively smaller spatial units, such as, for example, 10 cm increments.

According to certain embodiments, where the first sensor is one or more optical sensors, and the second sensor is compact IMU, the first positional resolution may be significantly finer than that of the second positional resolution. In such cases, the first sensor may be able to resolve the position of the tracked device at positional resolutions of 1 cm or less, while the second sensor may only be able to provide a positional resolution of 20 cm or more.

Embodiments of a method for device tracking, such as described with respect to FIG. 4 can provide a number of technical benefits, including extending the life cycle of existing devices, and allowing them to support motion tracking of devices outside the range of their current cameras. That is, applications receiving inputs based on user motor activity outside the field of view of the camera provided on the existing device (such as a phone or head-mounted device) can be implemented on existing devices. Enabling electronic devices to receive inputs based on user motor activity outside the field of view of the devices' cameras can also extend the overall tracking range of the electronic device, contributing to a more immersive user experience. By way of familiar example, in the case of a VR application providing a baseball simulation, out-of-view tracking can heighten the realism of the application by enabling the application to receive user inputs more closely modelled on a real-life throwing motion, where the user's hand typically goes behind her head prior to accelerating the ball forwards.

Embodiments of the method described by the example of FIG. 4 can also confer technical benefits for the designers of electronic devices and tracked electronic devices by extending the usability of sensors whose error profiles have significant temporally or spatially dynamic components. By setting an adjustable minimum threshold for acceleration information from such sensors, the error characteristics of the sensor can be managed without requiring changes to the logic of application receiving information from the sensor as application inputs.

Figure 5:
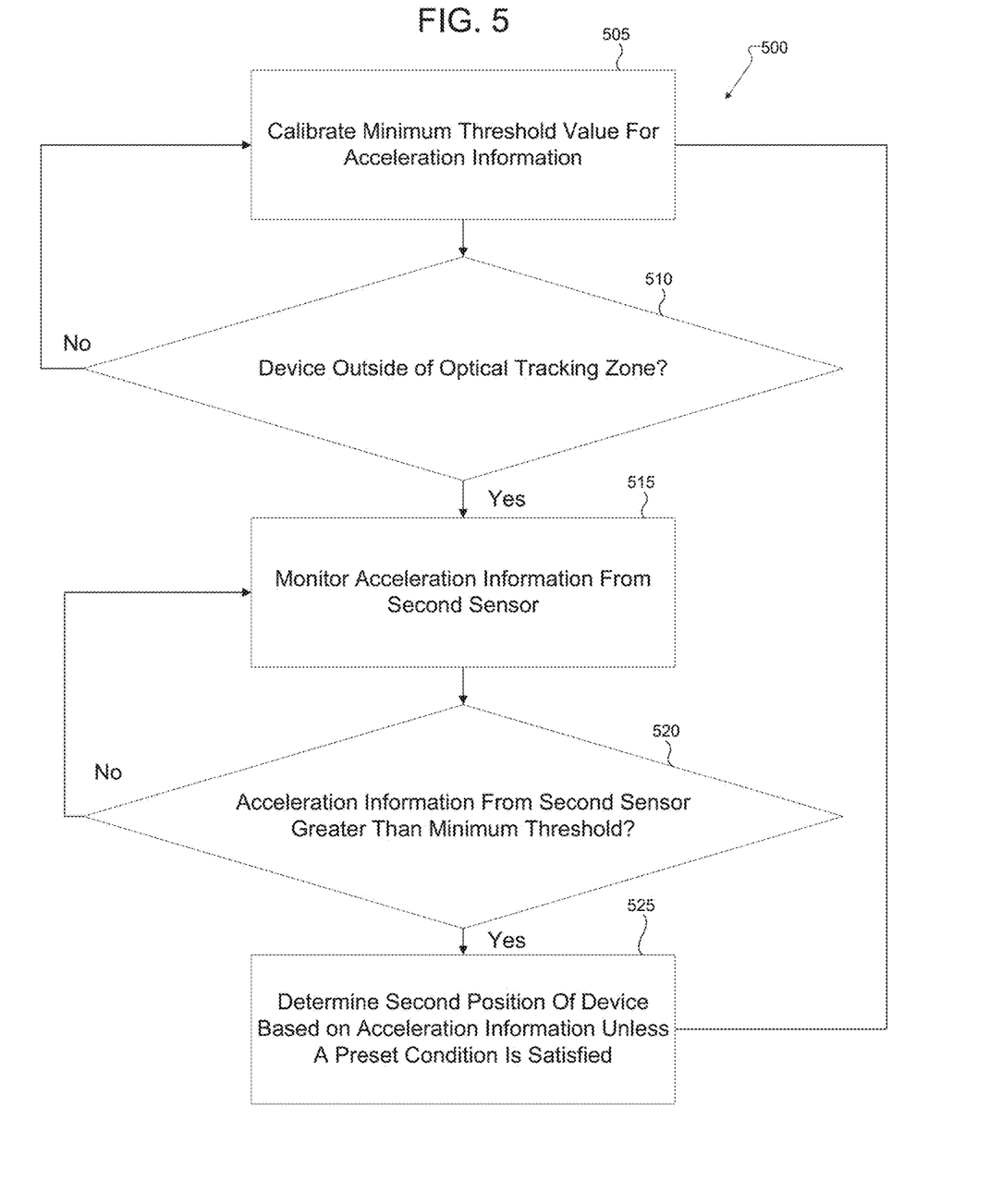
FIG. 5 illustrates a process for tracking a device according to this disclosure.

FIG. 5 illustrates a process 500 for tracking a device according to certain embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, a device for implementing device tracking.

At operation 505, an electronic device, such as electronic device 100 shown in FIG. 1, calibrates the minimum threshold value for acceleration information from a second sensor located on a tracked electronic device. In some embodiments, calibration entails comparing, by the electronic device, a position determined based on information received from a first sensor, such as an optical sensor, regarding the position of the tracked device within the optical tracking zone of the first sensor, against a position calculated based on information received from a second sensor. In this way, an updated error profile for the second sensor may be determined by the electronic device. In other embodiments, calibration of the minimum threshold value for acceleration information from the second sensor may be based on additional information, including, but not limited to, current temperature, a motion history of the tracked device, the applications running on the electronic device, and the inputs expected by the applications running on the electronic device. If, for example, at operation 505 the electronic device determines that the second sensor is performing comparatively well, and positions determined based on information from the second sensor correspond to positions determined based on information from the first sensor better than expected, the minimum threshold for acceleration information may be tuned downward. Similarly, if at operation 505, the electronic device determines that the second sensor is performing badly, and not able to generate information from which the position of the tracked device can be determined as accurately as predicted, the minimum threshold for acceleration information may be tuned upwards. Alternatively, the calibration of operation 505 by the electronic device may be informed by other inputs, such as the overall status of electronic device 100. For example, if the system usage sensor 188 shown in FIG. 1 indicates that main processor 140 is carrying a heavy processing load associated with other aspects of an application, such as generating rapidly changing graphics for display, the minimum threshold for acceleration may be adjusted upward to decrease the number of tracking inputs to be processed by main processor 140.

In certain embodiments, after calibrating a minimum threshold value for acceleration information from the second sensor, the electronic device determines whether the tracked device has exited the optical tracking zone of the first sensor at operation 510. If the electronic device determines that the tracked device has not exited the optical tracking zone, process 500 returns to operation 505. If, however, the electronic device determines that the tracked device has exited the optical tracking zone, the process advances to operation 515.

At operation 515, the electronic device monitors acceleration from the second sensor. In some embodiments, the first and second sensors are heterogeneous, and generate accelerate information differently. For example, the first sensor may, as noted above, be one or more camera or optical sensors, and the second sensor may be an IMU, gyroscope, or other non-optical sensors capable of generating acceleration information.

Next, at operation 520, a processor, such as the main processor 140 shown in FIG. 1 or the tracked device processor 245 shown in FIG. 2, performs a determination as to whether the monitored acceleration information is greater than the minimum threshold for acceleration information. In this example, the minimum threshold is the threshold set during the calibration performed in operation 505. Depending on embodiments, the minimum threshold value can be set as a single threshold value, or as a function with one or more arguments, such as time or an average value of acceleration information from multiple sensors on the tracked device.

According to some embodiments, if the processor determines at operation 520 that the acceleration information from the second sensor is not greater than a minimum threshold, then process 500 returns to operation 515, and the electronic device continues to monitor acceleration information from the second sensor. If the electronic device determines that the acceleration information is greater than a minimum threshold, then the process goes to operation 525, where, unless a preset condition is satisfied, the position of the tracked device is determined at a positional resolution corresponding to the minimum threshold value for acceleration information based on acceleration information from the second sensor. In some embodiments, such as, for example, where the second sensor has an error profile exhibiting a logarithmic degradation in positional accuracy over time, the preset condition may be a certain time after having been determined to have exited the optical tracking zone in operation 510. When the preset condition is satisfied, the electronic device will, for example, stop accepting acceleration information from the second sensor. The use of a preset condition at operation 525 can be particularly advantageous when using certain small, inexpensive IMUs. While such sensors present multiple benefits from cost, ruggedness and size perspectives, they may be susceptible to "drift" and other temporally dynamic errors, such that information recorded after a certain interval, for example, 500 ms to 1000 ms after calibration, is too noisy to be used for application inputs. In certain other embodiments, the preset condition is a determination by the electronic device that the tracked device has returned to the optical tracking zone of the first sensor. Alternatively, the preset condition may be a condition associated with an application receiving inputs based on the tracking of the device. Returning to the nonlimiting example of a VR baseball simulation as an illustration of an application utilizing device tracking according to the systems and methods of this disclosure, examples of preset conditions associated with an application include a user pausing the simulation, or switching to a gameplay mode (such as managing a team roster) wherein tracking the device is not necessary.

Figure 6:
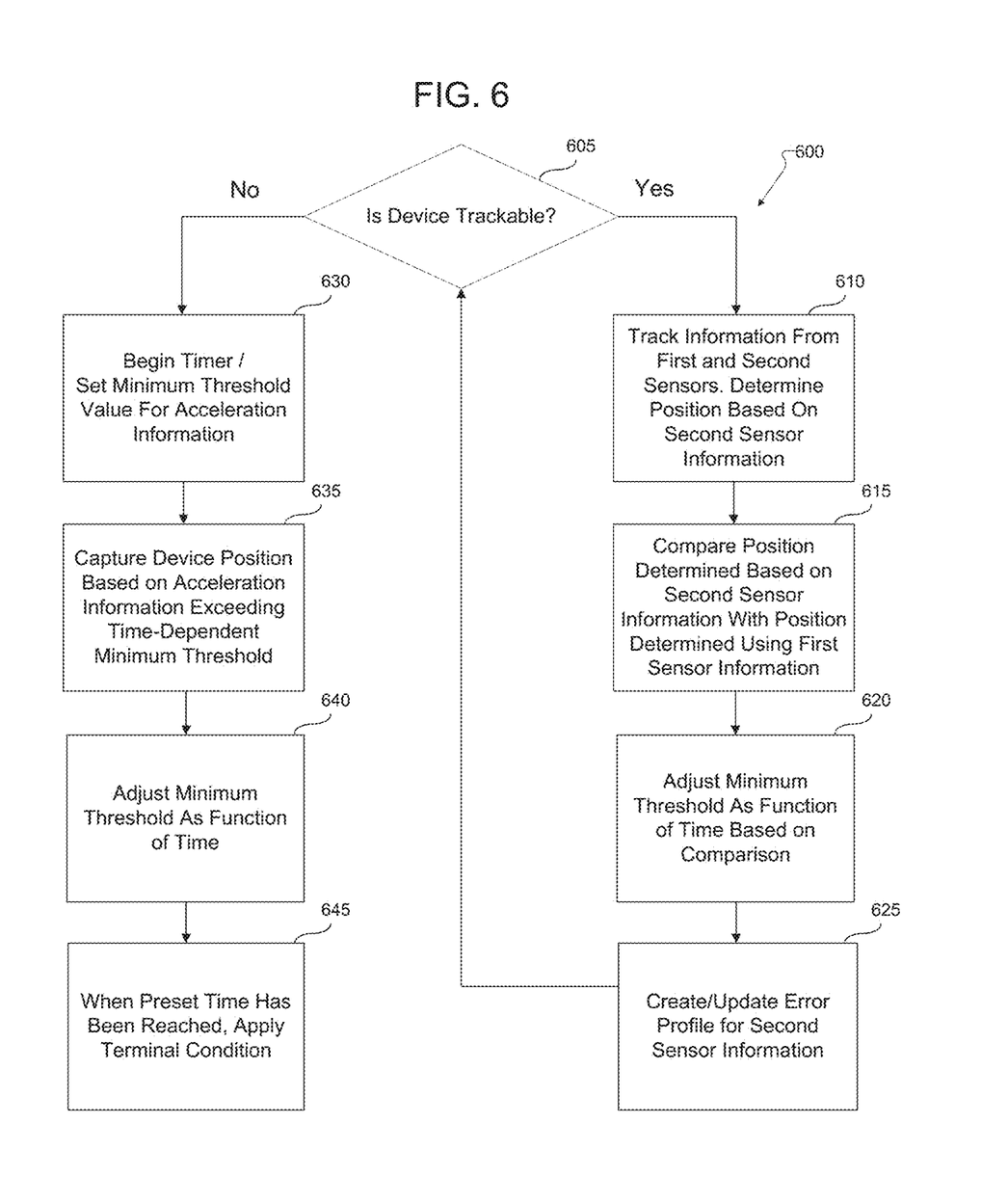
FIG. 6 illustrates a process for tracking a device according to this disclosure.

FIG. 6 illustrates a process for tracking a device according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, a device for implementing device tracking.

According to certain exemplary embodiments, at operation 605, an electronic device, such as electronic device 100 shown in FIG. 1, performs an initial determination of whether the position of a tracked device, such as device 200 shown in FIG. 2 can be tracked. In some embodiments, operation 605 consists of the electronic device determining whether the tracked device is in an optical tracking zone of a first sensor, such as a camera disposed on an electronic device. In other embodiments, operation 605 requires additional steps beyond determining whether the tracked device is in an optical tracking zone of a first sensor, such as the electronic device performing a diagnostic check to confirm that the relevant sensors on the electronic device and the tracked device are operable.

If the electronic device determines at operation 605 that the tracked device is trackable, then process 600 moves to operation 610, where the electronic device tracks one or more of acceleration or image information from first sensors on the electronic device, and second sensors disposed on the tracked device. In some embodiments, the first and second sensors are heterogeneous, and output different types of information. For example, the first sensor(s) may output one or more of image data or telemetry data from which the position of the tracked device can be determined, while the second sensor(s) may be one or more of accelerometers or IMUs, which output data corresponding to measured changes in lateral or rotational acceleration, or a combination thereof. In certain embodiments, the second sensor(s) measure inputs along 9 or more degrees of freedom (DOF) and also provide information corresponding to changes in the measured altitude of the tracked device. At operation 610, the electronic device also determines a position of the tracked device based on information provided by the second sensor.

According to some embodiments, once the electronic device determines the position of the tracked device based on information from the second sensor, at operation 615, a position determined based on information from the second sensor is compared against a position based on information from the first sensor. In this particular example, the first sensor is assumed to be able to determine the location of the tracked device, at least within its tracking zone, more accurately and at a higher positional resolution than the second sensor. At operation 620, the electronic device adjusts a minimum threshold value for acceleration information based on the comparison performed at operation 615. In this particular example, the value of the minimum threshold is a function of the time elapsed since the tracked device left the optical tracking zone of the first sensor. According to some embodiments, where the comparison performed at operation 615 indicates a better than expected correspondence between the positions determined based on information from the first and second sensors, the minimum threshold is adjusted downwards by the electronic device. For example, based on a comparison showing a better than expected correspondence between the determined positions, an initial minimum threshold value is reduced from 0.5 g to 0.4 g. At operation 625, the electronic device creates or updates an error profile for the second sensor information based on the comparisons and adjustments performed in operations 610, 615 and 620. According to certain embodiments, the error profile may contain information showing either or both of temporally or spatially dynamic components of the second sensor's error profile, as well as historical trends in the second sensor's performance. In this way, the positional resolution of positions determined by the electronic device based on second sensor information may be iteratively optimized. In some embodiments, after an error profile for the second sensor has been created or updated, process 600 loops back to operation 605.

According to certain embodiments, if the electronic device determines at operation 605 that the tracked device is not trackable, such as when the tracked device has exited the optical tracking zone of a first sensor on the electronic device, process 600 goes to operation 630. At operation 630 the electronic device sets a timer to record the time elapsed since performing a determination that the tracked device is not trackable. Further, the electronic device sets a minimum threshold value for acceleration information from the second sensor. In this particular example, the minimum threshold value is a t=0 value for a time dependent function that runs from t=0 to a preset time at which a terminal condition is applied.

In some embodiments, the electronic device determines that acceleration information from the second sensor exceeds the time dependent minimum threshold, and the electronic device further processes the received acceleration information to capture the tracked device's position at a positional resolution corresponding to a time-dependent value of the minimum threshold for acceleration information. In cases where the positional accuracy of the second sensor exhibits a logarithmic degradation, the electronic device may logarithmically increase the and the positional resolution of positions determined from information from the second sensor may likewise decrease logarithmically.

As a non-limiting example of logarithmic adjustment of the minimum threshold for acceleration information and positional resolution of distances, consider the case of an IMU exhibiting significant "drift" within 750-1000 ms of exiting the optical tracking zone of a first sensor. In this particular example, at time t=0, the minimum threshold for acceleration information is 1.1 g, with a corresponding positional resolution of 2 cm. The increase in minimum threshold and corresponding degradation of positional resolution for such a sensor is shown in Table 1 below.

TABLE 1

| Time (msec) | Minimum Threshold Value for Acceleration From Second Sensor | Positional Resolution |
|---|---|---|
| 0 | 1.1 g | 2 cm |
| 250 | 1.15 g | 2.8 cm |
| 500 | 1.23 g | 4.7 cm |
| 750 | 1.37 g | 10.3 cm |

In some embodiments, the minimum threshold is adjusted upward by the electronic device as a function of time at operation 640. This upward adjustment may, in some embodiments, be based solely on time elapsed since the device was determined at operation 605 to no longer be trackable. In other embodiments, the function defining the minimum threshold value for acceleration from the second sensor may have additional arguments, such as temperature or values corresponding to an application, a motion history or some combination thereof.

In the example of FIG. 6, when the timer set by the electronic device at operation 630 indicates that a preset time after the tracked device's exit from the optical tracking zone of the first sensor has elapsed, a terminal condition is applied by the electronic device at operation 645. In some embodiments, the terminal condition is an instruction to a processor to stop monitoring acceleration inputs from the second sensor until it returns to the optical tracking zone of the first sensor. In other embodiments, the terminal condition is a flag passed by a processor to an application indicating a temporary inability to receive accurate positional information from the tracked device. Returning to the nonlimiting example of a VR simulation of a baseball game as an illustration of an application utilizing device tracking according to this disclosure, where the tracked device corresponds to a ball about to be thrown by a pitcher, the application may process the passed flag as an input corresponding to the pitcher signaling to a manager or catcher. Numerous variations and implementations are possible.

Figure 7:
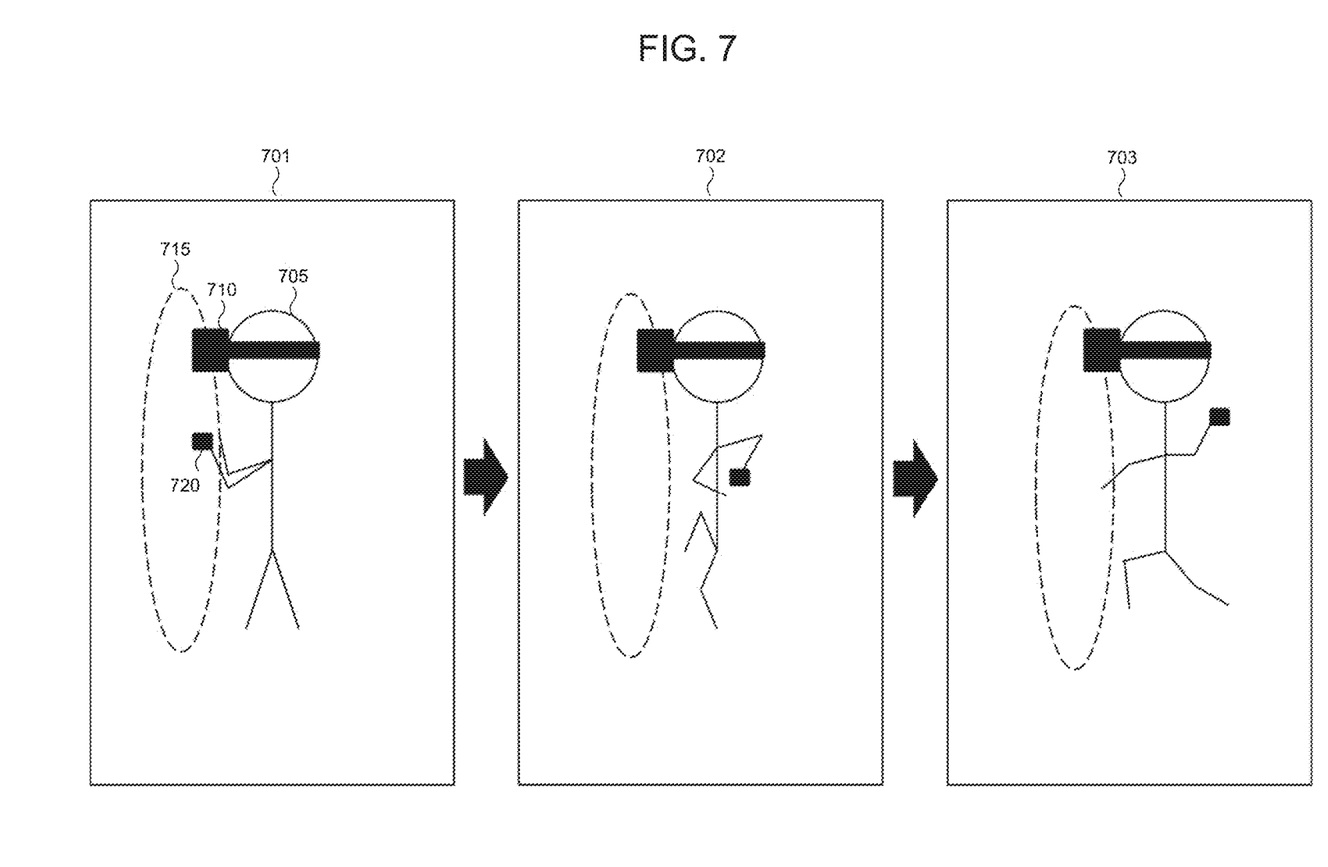
FIG. 7 illustrates an example of tracking a device according to this disclosure.

FIG. 7 illustrates an example of tracking a device according certain embodiments of this disclosure. The images shown in FIG. 7 are for illustration only. Other embodiments could be used without departing from the scope of this disclosure.

In this example, user 705 is interacting with a VR application running on an electronic device 710. Electronic device 710 can be a mobile phone operatively connected to a VR headset worn by user 705. According to some embodiments, electronic device 710 presents images from the VR application to the user via its own display, which may be one of the input/output devices 150 shown in the example of FIG. 1. In other embodiments, electronic device 710 presents the gameplay to the user via a display provided by the VR headset. Electronic device 710 has one or more outward facing optical sensors capable of providing an optical tracking zone 715. Electronic device 710 is communicatively connected to tracked device 720, which in this illustrative example, has a six (6) DOF IMU capable of detecting accelerations along three (3) perpendicular axes of lateral motion and three (3) perpendicular axes of rotation. In this particular example, the IMU in tracked device 720 exhibits a significant noise to signal ratio, but for the purposes of this example, may be expected to provide useful positional inputs for the application for a period of up to 1000 msec after exiting the optical tracking zone of electronic device 710. Further, the electronic device 710 has, for the purposes of this particular illustration, been configured to adjust the minimum threshold value for lateral acceleration information from the IMU of the tracked device according to the time dependent function summarized in Table 1 herein.

For the purposes of this illustrative example, the application running on electronic device 710 is a VR simulation of a baseball game, and the tracked motion of tracked device 720 corresponds to the path of a virtual baseball pitched by the user 705 as part of the application's gameplay. The illustrative example of FIG. 7 depicts, in scenes 701, 702 and 703, user 705 performing a pitching motion with the hand holding tracked device 720. Scene 701 depicts a time t=0, where user 705 has not yet begun a throwing motion. Scene 702 depicts a time in the early to middle stages of the throwing motion, around t=250 msec, during which the tracked device is being pulled backwards in readiness to throw. This stage of the motion is sometimes referred to as the "windup." Scene 703 depicts a time in the middle to late stages of the throwing motion, around 500 msec during which the tracked device is being accelerated forwards back towards optical tracking zone 715.

In scene 701 tracked device 720 is about to exit optical tracking zone 715. In this non-limiting example, the minimum acceleration threshold has been calibrated by the electronic device 710 at times t<0 based on information received from both the optical sensor(s) on electronic device 710, and the IMU on tracked device 720.

In scene 702, tracked device 720 has exited the optical tracking zone 715 recently, and is moving backwards in response to a relatively modest acceleration provided by user 705's throwing hand. In certain embodiments, setting the minimum threshold value according to a logarithmic time-dependent function can complement the game play. In this particular example, the time period in which the positional resolution of the second sensor is at its best corresponds to a phase of the simulated motion in which the acceleration is modest, and details of the user's motor activity based on relatively small accelerations (e.g., raising an elbow, or moving the "ball" outwards"), which may provide added realism to the application, may be captured.

In scene 703, tracked device 720 has been operating outside of optical tracking zone 715 for a relatively long period, and the minimum threshold value for acceleration has been adjusted by electronic device 710 upwards such that only comparatively large accelerations of tracked device 720 trigger determinations of the position of tracked device 720. In this particular example, in scene 703, user 705 has begun to "throw" tracked device 720 forward, producing the largest accelerations of the throwing motion. Once again, setting the minimum threshold value according to a logarithmic time-dependent function complements the game play, as the motor activity with associated with the greatest acceleration occurs in the portion of the out-of-optical-tracking-zone period where the minimum threshold value is greatest. In this way, the temporally and spatially dynamic components of the tracked device's IMU error profile (such as the tendency to "drift") are managed and never perceived by either the application or user 705. Other implementations are possible, and the references herein to a VR baseball simulation are intended to not to limit the scope of the disclosure, but rather to illustrate aspects of systems and methods for device tracking with reference to a broadly understood game and familiar set of motor activities.

Figure 8:
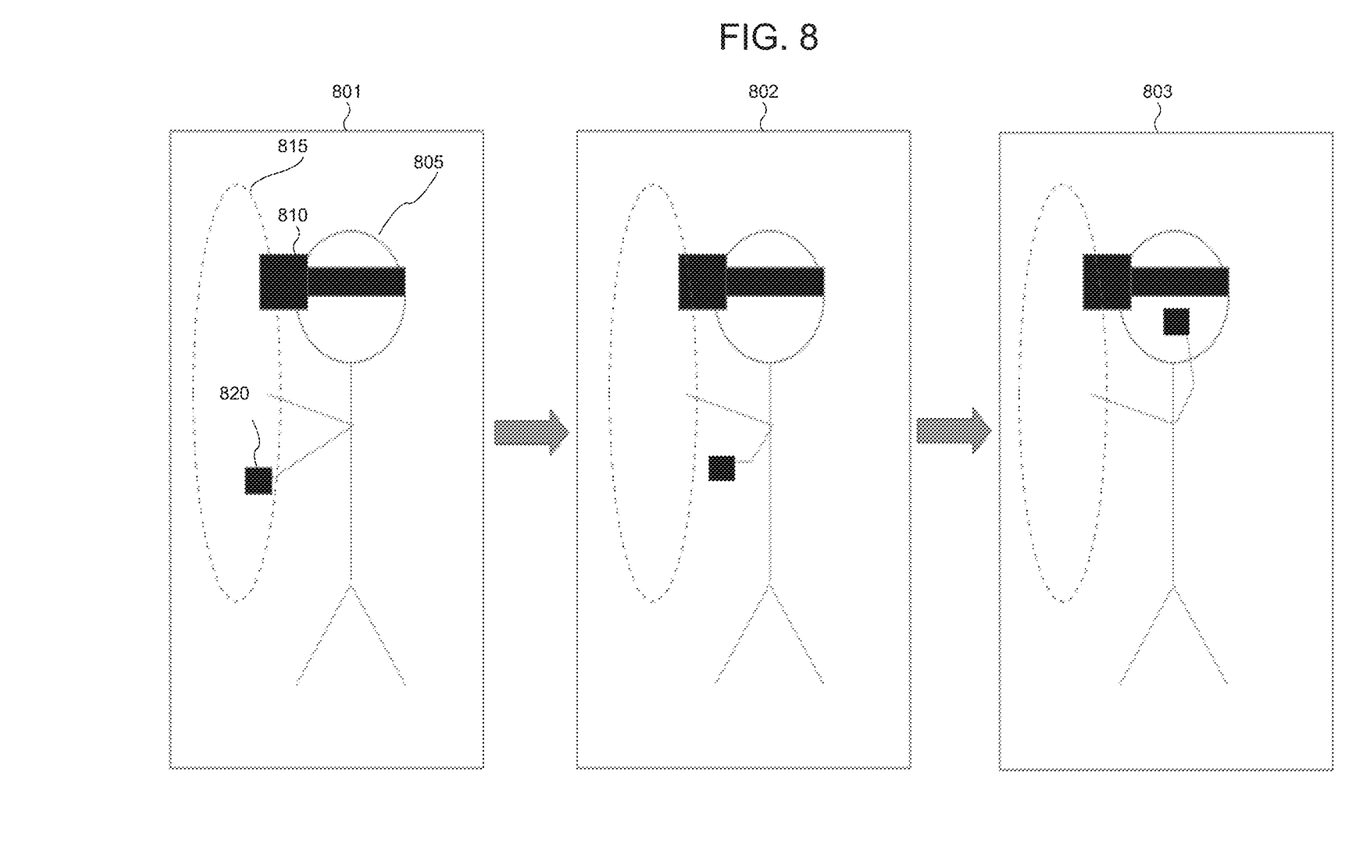
FIG. 8 illustrates another example of tracking a device according to this disclosure.

FIG. 8 illustrates a further example of tracking a device according to certain embodiments of this disclosure. The figures shown in FIG. 8 are for illustration only. Other embodiments could be used without departing from the scope of this disclosure.

In this example, user 805 is interacting with a VR application running on an electronic device 810. Electronic device 810 can be a mobile phone operatively connected to a VR headset worn by user 805. According to some embodiments, electronic device 810 presents images from the VR application to the user via its own display, which may be one of the input/output devices 850 shown in the example of FIG. 1. In other embodiments, electronic device 810 presents the gameplay to the user via a display provided by the VR headset. Electronic device 810 has one or more outward facing optical sensors capable of providing an optical tracking zone 815. Electronic device 810 is communicatively connected to tracked device 820, which in this illustrative example, has a six (6) DOF IMU capable of detecting accelerations along three (3) perpendicular axes of lateral motion and three (3) perpendicular axes of rotation. In this particular example, the IMU in tracked device 820 has a high noise to signal ratio, which may impose constraints on the time interval for which useful acceleration measurements may be obtained after leaving optical tracking zone 815. Further, the electronic device 810 has, for the purposes of this particular illustration, been configured to adjust the minimum threshold value for lateral acceleration information from the IMU of the tracked device according to the time dependent function summarized in Table 1 herein.

For the purposes of this illustrative example, the application running on electronic device 810 is a VR fantasy/adventure game whose gameplay includes operating a bow and arrow. In this example, the tracked motion of tracked device corresponds to the motion of an archer's draw hand. The illustrative example of FIG. 8 depicts, in scenes 801, 802 and 803, user 805 performing the motions of drawing the string of a bow back and holding it in a drawn position. Scene 1 depicts a time t=0, where user 805 has not yet begun the motion of drawing the bowstring back. Scene 802 depicts an intermediate step, around t=250-500 msec after the tracked device 820 has left optical tracking zone 815, during which user 805 is affirmatively moving his or her draw hand back, as if tensioning a bow. Scene 803 depicts a terminal period, during which the user simulates the motion of holding a drawn bow prior to releasing an arrow. The period depicted in Scene 803 may start ~1000 msec after the tracked device 820 has left optical tracking zone 815 and lasting for a few seconds.

In scene 801, the tracked device 820 is about to exit optical tracking zone 815. In this non-limiting example, the minimum acceleration threshold has been calibrated by the electronic device 810 at times t<0 based on information received from both the optical sensor(s) on electronic device 810 and the IMU on tracked device 820.

In scene 802, tracked device 820 has exited the optical tracking zone 815 recently, and is moving backwards in response to a relatively modest acceleration provided by user 805's draw hand while simulating drawing and aiming a bow.

In scene 803, tracked device 820 has been operating outside of optical tracking device for a long period. Given the long interval since its last calibration, the IMU in tracked device 820 may exhibit significant "drift." According to certain embodiments, the drift associated with this long interval outside the optical tracking zone may be managed by raising the minimum threshold value for acceleration such that only extremely large accelerations will register as movements of the user's draw hand. According to other embodiments, a preset time outside of the optical tracking zone 815 will be reached, and in response, a terminal condition, such as the application no longer receiving acceleration information from tracked device 820 until it returns to optical tracking zone 815. In such cases, the application may, for example, depict the user's bow as remaining "locked" in a drawn position until a preset condition, such as an input from a haptic finger sensor in tracked device 820 simulating the release of an arrow, is met. In this way, the temporally and spatially dynamic components of the tracked device's IMU error profile (such as the tendency to "drift") are managed.

Although the present disclosure has been described with exemplary embodiments, various changes and modifications may be suggest to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for tracking a position of a device, the method comprising:
   capturing, at a first positional resolution, based on information from a first sensor, a first position of the device within an optical tracking zone of the first sensor;
   determining, based on information from the first sensor, that the device exits the optical tracking zone of the first sensor; and
   responsive to determining that the device exits the optical tracking zone of the first sensor, capturing, at a second positional resolution, a second position of the device based on acceleration information from a second sensor,
   wherein the second positional resolution corresponds to a minimum threshold value for the acceleration information from the second sensor, and
   wherein the minimum threshold value for the acceleration information from the second sensor is based on an error profile for the second sensor maintained by the device.

2. The method of claim 1, further comprising:
   calibrating the minimum threshold value for acceleration information from the second sensor based on information from the first sensor while the device is in the optical tracking zone of the first sensor.

3. The method of claim 1, further comprising:
   beginning a timer to record a time when the device exits the optical tracking zone of the first sensor;
   while the device is outside of the optical tracking zone of the first sensor, adjusting the minimum threshold value for acceleration information from the second sensor as a function of the time the device is outside of the optical tracking zone of the first sensor; and
   resetting the timer in response to the device reentering the optical tracking zone of the first sensor.

4. The method of claim 2, further comprising:
   calibrating the minimum threshold value for acceleration information from the second sensor based on at least one of temperature, a type of application running on the device, a type of input for an application running on the device, or a motion history of the device.

5. The method of claim 1, wherein the second position corresponds to a spatial coordinate in a coordinate system having six degrees of freedom (DOF).

6. The method of claim 1, wherein at least one of the first position or the second position of the device is input to at least one of a virtual reality (VR) application or an augmented reality (AR) application.

7. The method of claim 1, wherein the second sensor is an inertial measurement unit (IMU).

8. A system for tracking a position of a device, the system comprising:
a memory;
a first sensor;
an input/output interface; and
a processor operably connected to the memory, the input/output interface and the first sensor, the processor configured to:
capture, at a first positional resolution, based on information from the first sensor, a first position of the device within an optical tracking zone of the first sensor,
determine, based on information from the first sensor, that the device exits the optical tracking zone of the first sensor, and
responsive to determining that the device exits the optical tracking zone of the first sensor, capture, at a second positional resolution, a second position of the device based on acceleration information from a second sensor received via the input/output interface,
wherein the second positional resolution corresponds to a minimum threshold value for the acceleration information from the second sensor, and
wherein the minimum threshold value for the acceleration information from the second sensor is based on an error profile for the second sensor maintained by the device.

9. The system of claim 8, wherein the processor is configured to:
calibrate the minimum threshold value for acceleration information from the second sensor based on information from the first sensor while the device is in the optical tracking zone of the first sensor.

10. The system of claim 8, wherein the processor is configured to:
begin a timer to record a time when the device exits the optical tracking zone of the first sensor,
while the device is outside of the optical tracking zone of the first sensor, adjust the minimum threshold value for acceleration information from the second sensor as a function of the time the device is outside of the optical tracking zone of the first sensor, and
reset the timer in response to the device reentering the optical tracking zone of the first sensor.

11. The system of claim 9, wherein the processor is configured to:
calibrate the minimum threshold value for acceleration information from the second sensor based on at least one of a temperature, a type of application running on the system, a type of input for an application running on the system, or a motion history of the device.

12. The system of claim 8, wherein the second position corresponds to a spatial coordinate in a coordinate system having six degrees of freedom (DOF).

13. The system of claim 8, wherein at least one of the first position or the second position is input to at least one of a virtual reality (VR) application or an augmented reality (AR) application.

14. The system of claim 8, wherein the second sensor is an inertial measurement unit (IMU).

15. A non-transitory computer-readable medium comprising program code that, when executed by a processor, causes a system to:
capture, at a first positional resolution, based on information from a first sensor, a first position of a device within an optical tracking zone of the first sensor,
determine, based on information from the first sensor, that the device exits the optical tracking zone of the first sensor, and
responsive to determining that the device exits the optical tracking zone of the first sensor, capture, at a second positional resolution, a second position of the device based on acceleration information from a second sensor,
wherein the second positional resolution corresponds to a minimum threshold value for the acceleration information from the second sensor, and
wherein the minimum threshold value for the acceleration information from the second sensor is based on an error profile for the second sensor maintained by the device.

16. The non-transitory computer-readable medium of claim 15, further comprising program code that, when executed by the processor, causes the system to:
calibrate the minimum threshold value for acceleration information from the second sensor based on information from the first sensor while the device is in the optical tracking zone of the first sensor.

17. The non-transitory computer-readable medium of claim 15, further comprising program code that, when executed by the processor, causes the system to:
begin a timer to record a time when the device exits the optical tracking zone of the first sensor,
while the device is outside of the optical tracking zone of the first sensor, adjust the minimum threshold value for acceleration information from the second sensor as a function of the time the device is outside of the optical tracking zone of the first sensor, and
resetting the timer in response to the device reentering the optical tracking zone of the first sensor.

18. The non-transitory computer-readable medium of claim 16, further comprising program code that, when executed by the processor, causes the system to:
calibrate the minimum threshold value for acceleration information from the second sensor based on at least one of temperature, a type of application running on the system, a type of input for an application running on the system, or a motion history of the device.

19. The non-transitory computer-readable medium of claim 15, wherein the second position corresponds to a spatial coordinate in a coordinate system having six degrees of freedom (DOF).

20. The non-transitory computer-readable medium of claim 15, wherein at least one of the first position or the second position of the device is input to at least one of a virtual reality (VR) or an augmented reality (AR) application.

* * * * *